Jan. 6, 1970 W. R. TOLMAN 3,488,458

MINIATURE SLIDE-TYPE TELEPHONE SWITCHHOOK

Filed Jan. 9, 1967 2 Sheets-Sheet 1

INVENTOR
W. R. TOLMAN
BY Charles E. Graves
ATTORNEY

United States Patent Office 3,488,458
Patented Jan. 6, 1970

3,488,458

MINIATURE SLIDE-TYPE TELEPHONE SWITCHHOOK

Warren R. Tolman, Indianapolis, Ind., assignor to Bell Telephone Laboratories, Incorporated, Murray Hill and Berkeley Heights, N.J., a corporation of New York Filed Jan. 9, 1967, Ser. No. 608,038
Int. Cl. H04m *1/08;* H01h *15/00, 1/36*
U.S. Cl. 179—159 6 Claims

ABSTRACT OF THE DISCLOSURE

The inner wall of a miniature insulative tube is equipped with longitudinal grooves with electrical end contacts in the floors of each groove. Springs separately mounted on a central plunger bridge the contacts in the respective grooves. Sequential make or break operation is achieved by different lengths of end contacts.

This invention relates to slide type multicontact electrical switches and more specifically concerns a switch of this type for use in telephones as a switchhook or as a so-called common switch for pushbutton dials.

The conventional telephone switchhook currently in use is comprised of several electrical spring contacts arranged in a so-called pileup which is actuated by a plunger to effect certain desired connections and disconnections between a central office and the ringer and speech networks of a telephone station. Certain of the connections are made sequentially. The switchhook usually is biased to remain in an "offhook" mode in the absence of some force such as the weight of a handset or the depressing by hand of the plunger.

Telephone switchhooks of earlier designs inherently have been large and space consuming. As they are mounted typically in a telephone base stand which itself has been of bulky design, the space needs of telephone switchhooks to date have not been a significant problem. With the increasing trend to lighter, more compact telephones, however, the classic telephone switchhook design becomes increasingly difficult to accommodate in the space available. The same problem arises in the newer telephones equipped with pushbutton dials with respect to the common switch therein used.

Accordingly, one object of the invention is to reduce the size and weight of multicontact telephone switches.

An added object of the invention is to simplify the construction of a telephone switchhook.

A further object of the invention is to reduce substantially the cost of a telephone switchhook.

These and further objects are achieved pursuant to the invention by a telephone switchhook characterized by an elongated cylinder or tube with a plurality of longitudinal grooves placed in the tube's inside wall, each such groove having electrical contacts in the floors at their ends. Each contact pair associated with each groove is bridged by a spring contact which is one of several mounted on a plunger disposed within the tube axially. Each such spring contact rides in a separate groove; and provided there are three or more such grooves the plunger is amply supported by its own spring contacts.

Pursuant to one aspect of the invention, the electrical contacts at the ends of each individual groove are of differing lengths while the spring contacts of the rod plunger are of the same length. This achieves the sequential operation normally necessary to the function of a telephone switchhook. Alternatively, the contacts of the grooves can be of the same length and the spring contacts of the plunger can in such case be of different lengths to provide the desired sequencing.

Advantageously, the cylinder or tube is fabricated of a ceramic, plastic such as polysulfone or other sturdy fire retardant, heat resistive nonconducting material. Each spring contact is electrically insulated from its fellows although occasions can be envisioned where cross-connections may be desirable.

Further, mounting the spring contacts to the rod plunger by ultrasonic embedding is economical and results in a very sturdy reliable actuator.

One feature of the invention, accordingly, is an inner envelope such as the inside surface of a tube, in which a plurality of longitudinal grooves are disposed, each groove having an electrical contact surface at opposite ends thereof, the electrical connection between each such contact pair being made by one of a group of spring members radially disposed on a plunger.

A further feature of the invention concerns the sequencing action of such a switch through variations in the length of the contact pairs in the grooves.

These and other objects and features of the invention will become more apparent from a reading of the description to follow of an illustrative embodiment of the invention and the drawing in which.

Figure 1:
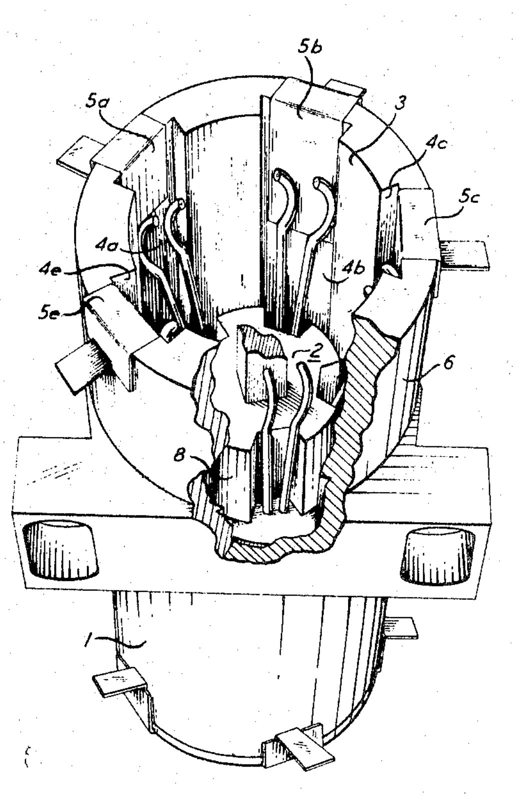
FIG. 1 is a top perspective view in partial cutaway showing the inside of the tube with plunger.

The entire switchhook of the present invention is contained in a simple assembly such as illustrated in FIG. 1 which shows a cylinder or tube 1 protectively housing a plunger assembly 2. Both are fabricated from nonconductive material. The inner wall 3 of tube 1 contains a plurality of longitudinal grooves 4*a*, 4*b*, 4*c*, 4*d*, 4*e*. Five such grooves are illustrated; but a greater or lesser number may be used in accordance with the needs of the switchhook.

Located in the opposite end portions of the floors of each of these longitudinal grooves is a set of electrical contact strips 5*a*, 5*b*, 5*c*, 5*d*, 5*e*. The contact surface of each such strip is flush with the floor of its respective groove to ensure smooth travel for the spring contactors shortly to be described. Advantageously, the side walls of each groove 4*a*, 4*b*, 4*c*, 4*d*, 4*e* are inwardly tapered to assist in locking the strips in their flush embedded positions. Each contact strip is led out the end of its groove and bent down upon outer wall 6 of tube 1 to provide connection points.

Figure 3:
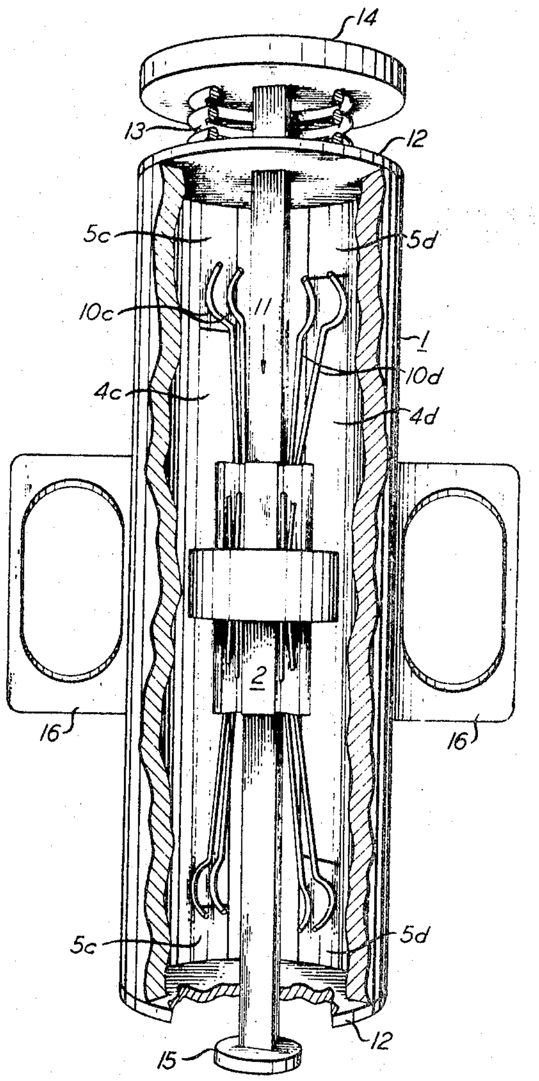
FIG. 3 is a side view in cutaway showing the plunger mounted in the tube.

In accordance with one aspect of the invention, the several strip pairs—e.g., strip pairs 5*d* and 5*e* shown in FIG. 3—may be of differing lengths so that a desired sequence of closures and openings may be achieved. Further mention of this feature is made below.

Figure 2:
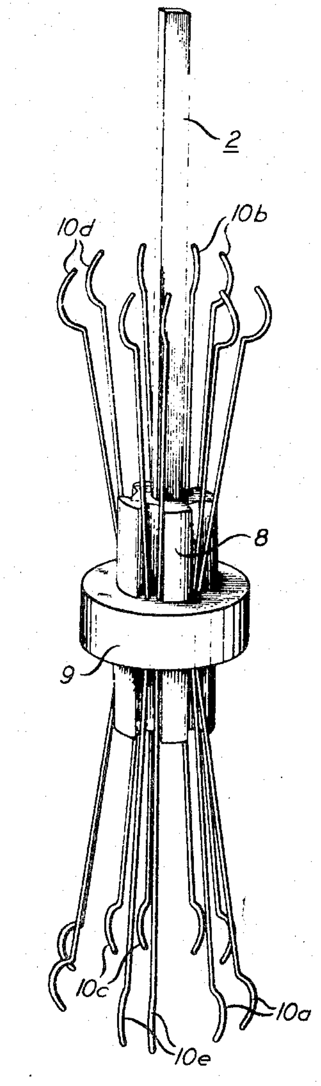
FIG. 2 is a side perspective view of the plunger and its springs.

FIG. 2 shows one illustrative embodiment of the plunger assembly 2 as comprising an elongated rod 7 normally made of plastic on which is mounted in some suitable fashion grooved cylinder 8. As seen in FIG. 1, the grooves of cylinder 8 are spaced radially to match the spacing of the grooves 4*a*, 4*b*, 4*c*, 4*d*, 4*e*. Embedded in the several grooves of cylinder 8 by means of epoxy, for example, are spring contactors 10*a*, 10*b*, 10*c*, 10*d*, 10*e*. A retainer ring such as 9 may be included to aid in securing the spring contactors. In the inventive embodiment shown, the spring contactors 10*a*, 10*b*, 10*c*, 10*d*, 10*e* each comprise a pair of spring wires with suitable offset contoured ends to act as slide contacts. Other spring contactor configurations including three or more spring wires or flat springs are, however, also suitable. Cylinder 8 may be mounted near the end of rod 7, as shown in FIG. 2; or near the middle of rod 7 as shown in FIGS. 1 and 3, depending upon the design requirements of a given switch. Also, it may be desirable to form grooved cylinder 8 and ring 9 as one piece.

Assembly time is significantly shortened if, instead of relying on epoxy bonding to affix the spring contactors, the contactors are ultrasonically embedded onto the surface of a cylinder such as 9. The latter process is quick and, of course, requires no curing time or extra jig.

For purposes of the present illustration, all of the spring contactors 10*a*, 10*b*, 10*c*, 10*d*, 10*e* are equal in length and mounted within the same longitudinal region of rod 7. In such an arrangement, the sequential operation is dependent on the differing lengths of the strips *5a*, *5b*, *5c*, *5d*, *5e*. As seen in FIG. 3, when the plunger assembly is pressed downwardly in the direction of arrow 11, electrical contact will be made between the strip pair *5c* through the spring contactor 10*c*. At the same time, either before or after the last-mentioned contact is effected, spring contactor 10*d* in moving down breaks a connection between the strip pair *5d*. Other desired make or break operations are concurrently effected for the remaining strip pairs *5a*, *5b*, *5c* through their respective spring contactors.

Alternatively, it is seen readily that the strip pairs may all be of the same length and the sequential operation may then be effected through differing lengths of the spring contactors, or by displacing the spring contactors with respect to one another, or through some combination thereof.

The inwardly-tapered side walls of each longitudinal groove *4a*, *4b*, *4c*, *4d*, *4e* also serve as guides or fences for the traveling spring contactors 10*a*, 10*b*, 10*c*, 10*d*, 10*e*. Each of the latter, when placed within its respective grooves, flex and exert a biasing force to effect good electrical contact with its respective strips. If three or more spring-groove contacts are present in the switch, it is seen that the plunger assembly is largely self-supporting upon its own contacts. It may be desirable however to include added plunger rod guides as noted below.

FIG. 3 shows top and bottom guide discs 12 disposed upon the ends of tube 1. Discs 12 include central guide slots which accommodate rod 7 and aid in positioning it. Discs 12 also complete a protective enclosure around the electrical contact surfaces.

The biasing of rod 7 may be effected, for example, by a bias spring 13 operating between upper disc 12 and a cap 14 and rod 7. A stop such as 15 on the other end of rod 7 limits the axial displacement between the rod assembly 2 and tube 1. A pair of mounting wings 16 enable the switch to be affixed within a telephone base, for example, suitably with respect to a lever arrangement (not shown) conventionally forming a part of the handset cradle. The plunger assembly 2 need not be biased, however; an alternative arrangement (not shown) is seen readily to be push-pull.

The above described switches are, of course, applicable not only to the telephone switchhook art but also to a wide variety of devices in which space, simplicity and sequential action are prime desiderata.

In summary, a tubular slide switch has been described which is particularly promising as a replacement for the current large, space-consuming telephone switchhook. Its construction is exceedingly compact and simple, its cost is substantially less than current switchhook designs, and its reliability promises to equal that of the far larger spring pileup telephone switchhook design now used. In contrast to current switchhook designs, its length is little more than that of a paper clip.

It should be understood that the embodiments herein illustrated are merely a few of many possible configurations employing the basic inventive concepts, and that all such configurations are intended to be covered within the scope of the claims to follow.

What is claimed is:

1. An electrical switch comprising an elongated housing having a closed cylindrical inner surface, a plurality of longitudinal grooves spaced apart on said surface, contact means disposed at the end portions of each said groove, a plunger, a like plurality of conducting spring contactors disposed radially on said plunger, each said contactor having a pair of end portions, said plunger supported axially within said tube, with said end portion of each said spring contactor making selective sliding contact with the end contacts in its corresponding groove.

2. An electrical switch in accordance with claim 1 wherein said end portions of each said spring contactor are bowed upwardly to make guiding contact with the wall portions of its respective groove, thereby to fix said contactor within its respective said groove.

3. A switch in accordance with claim 2 wherein the side walls of each said groove are inwardly tapered to lock in said contact means and to guide each said spring contactor in its travel.

4. A telephone switchhook comprising an elongated housing including a generally cylindrical elongated inner surface, at least three grooves longitudinally disposed upon said cylindrical inner surface, each said groove including at each of its end portions an electrical contacting surface flush with the floor of said groove, a plunger disposed for longitudinal movement within said inner tube, said plunger comprising a plurality of spring contactors spacedly mounted at their midportions to the midportion of said plunger, each leg of each said spring contactor being outwardly biased, the legs of each respective spring contactor riding in a separate groove in said inner tube, each said leg including an inwardly turned contacting portion for contacting the end contacts in their respective grooves and for guidably maintaining itself within said groove, each said spring contactor making electrical connection with its said end contacts of each groove.

5. A telephone switchhook in accordance with claim 4 wherein the contacts in each end of each said groove are selectively spaced so that longitudinal movement of said plunger effects an ordered sequence of connections and disconnections between the respective pairs of end contacts.

6. A telephone switchhook in accordance with claim 5 further including means for biasing said plunger in extreme position with respect to said tube.

References Cited

UNITED STATES PATENTS

| | | | |
|---|---|---|---|
| 3,225,149 | 12/1965 | Schlesinger | 200—16 |
| 3,261,928 | 7/1966 | Schlesinger | 200—16 X |
| 3,387,102 | 6/1968 | Brown | 179—165 |
| 615,344 | 12/1898 | Burger et al. | 179—102 |

WILLIAM C. COOPER, Primary Examiner

U.S. Cl. X.R.

200—16, 163, 164